(12) United States Patent
Standaert et al.

(10) Patent No.: US 8,969,494 B2
(45) Date of Patent: Mar. 3, 2015

(54) CAPS AND CLOSURES

(71) Applicant: Total Petrochemicals Research Feluy, Seneffe (BE)

(72) Inventors: Alain Standaert, Brussels (BE); Romain Luijkx, Chercq (BE); Martine Slawinski, Nivelles (BE); Aurelien Vantomme, Bois-de-Villers (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 14/021,176

(22) Filed: Sep. 9, 2013

(65) Prior Publication Data

US 2014/0008844 A1  Jan. 9, 2014

Related U.S. Application Data

(63) Continuation of application No. 13/378,190, filed as application No. PCT/EP2010/059999 on Jul. 12, 2010, now Pat. No. 8,580,895.

(30) Foreign Application Priority Data

Jul. 10, 2009 (EP) .................................... 09165213
Feb. 15, 2010 (EP) .................................... 10153585

(51) Int. Cl.
*C08F 4/6592* (2006.01)
*C08F 210/02* (2006.01)
*C08L 23/08* (2006.01)
*C08F 4/76* (2006.01)
*C08F 210/16* (2006.01)
*C08L 23/06* (2006.01)
*C08F 4/659* (2006.01)
*C08F 110/02* (2006.01)

(52) U.S. Cl.
CPC ................. *C08F 4/76* (2013.01); *C08F 210/16* (2013.01); *C08L 23/06* (2013.01); *C08F 4/65908* (2013.01); *C08F 4/65912* (2013.01); *C08F 4/65927* (2013.01); *C08L 23/0815* (2013.01); *C08L 2203/10* (2013.01); *C08L 2205/02* (2013.01); *C08L 2205/025* (2013.01); *C08L 2314/06* (2013.01); *C08F 110/02* (2013.01); *Y10S 526/943* (2013.01)
USPC ............. 526/160; 526/65; 526/165; 526/348; 526/943; 525/240

(58) Field of Classification Search
CPC ............ C08F 4/65912; C08F 4/65927; C08F 210/02; C08L 23/0815
USPC ............. 526/65, 160, 165, 348, 943; 525/240
See application file for complete search history.

(56) References Cited

U.S. PATENT DOCUMENTS

| | | |
|---|---|---|
| 6,380,311 B1 | 4/2002 | Razavi et al. |
| 2004/0157988 A1 | 8/2004 | Miserque et al. |
| 2004/0181010 A1 | 9/2004 | Miserque et al. |
| 2008/0257854 A1 | 10/2008 | Stephenne et al. |

*Primary Examiner* — Caixia Lu

(57) ABSTRACT

This invention discloses caps and closures produced by injection molding with a bimodal high density polyethylene (HDPE) resin comprising a low molecular weight, high density polyethylene fraction substantially free of comonomer and a high molecular weight, low density polyethylene fraction, having a molecular weight distribution of at least 3.5, preferably greater than 4.0, prepared in two reactors connected in series in the presence of a metallocene-containing catalyst system, wherein the metallocene comprises a bisindenyl or a bis-tetrahydrogenated-indenyl component.

16 Claims, 1 Drawing Sheet

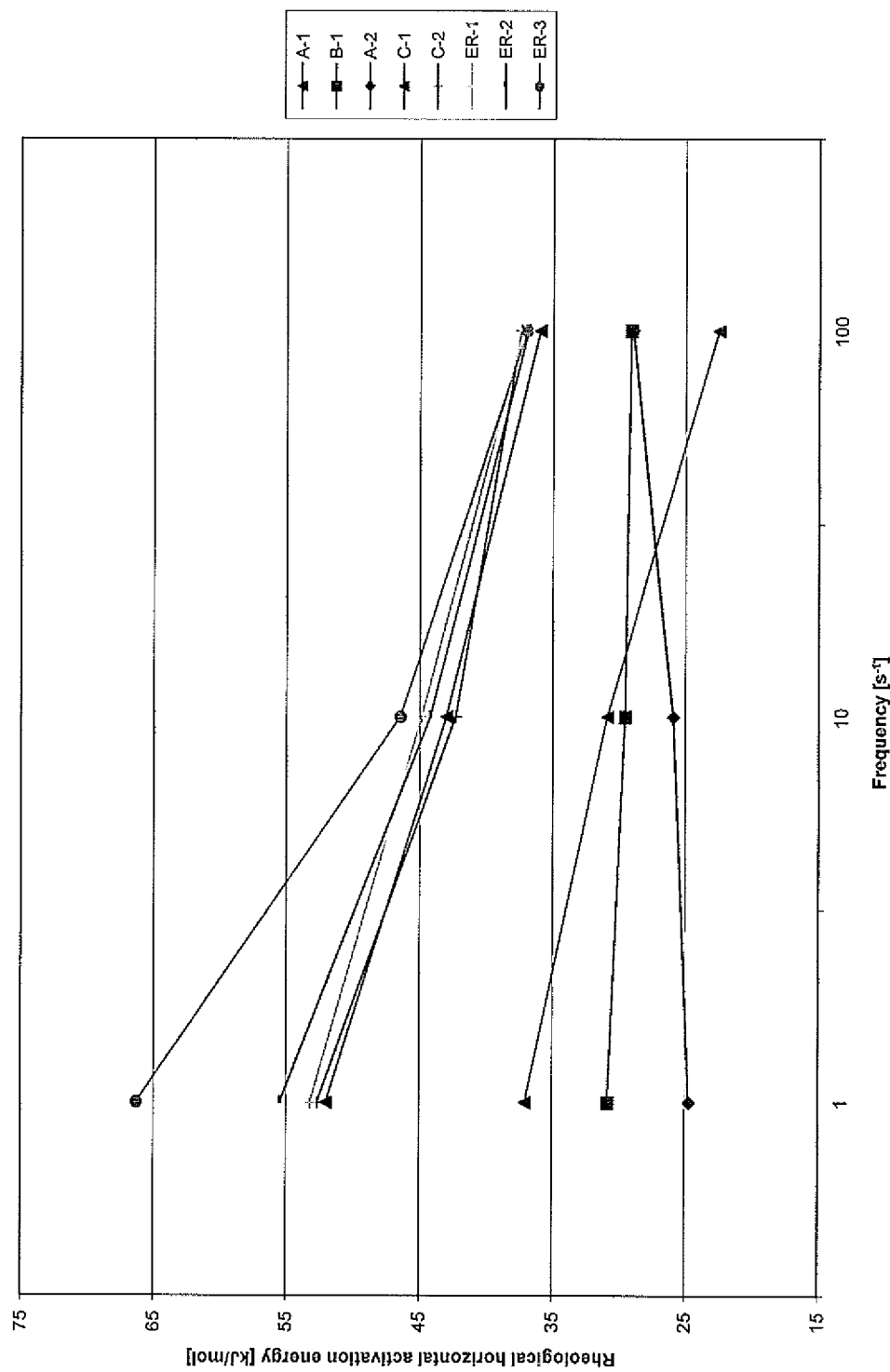

CAPS AND CLOSURES

CROSS-REFERENCE TO RELATED APPLICATIONS

This application is a continuation of U.S. patent application Ser. No. 13/378,190 filed on Feb. 10, 2012, which is a National Stage Entry of PCT/EP2010/059999 filed on Jul. 12, 2010, which claims priority from EP 09165213.1 filed on Jul. 10, 2009 and from EP 10153585.4 filed on Feb. 15, 2010.

The present invention relates to a bimodal high density polyethylene (HDPE) resin suitable for preparing injection-moulded articles, in particular caps and closures. In particular, the caps and closures of the invention can be used for closing bottles, such as bottles for carbonated and still drinks.

Caps and closures are generally prepared with HDPE resins produced with Ziegler-Natta (ZN) catalyst systems. These resins have a reasonably high stress crack resistance (ESCR), but they leave room for improvement. Monomodal Ziegler-Natta polyethylenes for example only have average ESCR, processing properties and dimensional stability. Particularly, the organoleptic properties require much improvement. Such resins are for example Hostalen® GD4755 commercialised by LyondellBasell or Eltex® B4020N1331 commercialised by Ineos. In comparison bimodal Ziegler-Natta polyethylenes have improved ESCR and processing properties, but to the detriment of dimensional stability and organoleptic properties. Such resins are for example Hostalen® ACP6541A or Eltex® Superstress CAP602. Thus, there remains a need to find resins with improved ESCR, processing properties, dimensional stability and organoleptic properties for use in injection moulding applications, in particular for making caps and closures.

HDPE metallocene-prepared resins having a narrow monomodal polydispersity index of less than 3 tested in the field of caps and closures exhibit good organoleptic properties and dimensional stability (see EP 1357136), but limited mechanical properties.

EP 1 833 908 discloses caps and closures produced by injection moulding with a metallocene-catalysed bimodal high density polyethylene (HDPE) resin, the metallocene being a bridged bisindenyl or bis-tetrahydroindenyl. These have good ESCR, organoleptic properties and dimensional stability. However, both the ESCR and the processing properties can still be improved. In particular, the processability of the bimodal polyethylene therein is comparable to bimodal Ziegler-Natta polyethylene. Thus, there is a need to find a resin with better processability i.e. increased production rate and/or decreased energy consumption and/or extended mould life and/or reduced maintenance frequency of the mould. Improved processability, however, should not be at the cost of worsening other properties of the caps and closures. In particular, improved processability is required without reducing the environmental stress crack resistance and without deterioration of the organoleptic properties, dimensional stability, tightness of fit and ease of opening.

Thus it is an aim of the present invention to prepare resins that can be used to produce articles, in particular caps and closures, more rapidly by injection moulding.

It is also an aim of the present invention to prepare resins that can be used to produce articles, in particular caps and closures, by injection moulding with less mould wear.

It is further an aim of the present invention to increase the lifespan of the mould used in injection moulding of articles, in particular caps and closures.

It is an aim of the present invention to reduce the maintenance frequency of the mould used in injection moulding of articles, in particular caps and closures.

It is also an aim of the present invention to produce injection-moulded articles, in particular caps and closures, with the same or even improved environmental stress crack resistance.

It is yet another aim of the present invention to provide injection-moulded articles, in particular caps and closures, with the same or even improved tightness.

It is a further aim of the present invention to prepare injection-moulded articles, in particular caps and closures, with the same or even improved dimensional stability.

It is also an aim of the present invention to produce injection-moulded articles, in particular caps and closures, with the same or even improved ease of opening.

It is yet a further aim of the present invention to prepare injection-moulded articles, in particular caps and closures, with the same or even improved organoleptic properties.

One or more of the aims above are solved by the present invention.

SUMMARY OF THE INVENTION

Accordingly, the present invention discloses a bimodal high density polyethylene (HDPE) resin for preparing injection-moulded articles, in particular caps and closures, comprising two polyethylene fractions A and B, prepared in different reactors of two reactors connected in series in the presence of a metallocene-containing catalyst system, wherein the metallocene is a bridged bisindenyl metallocene and/or bridged bis-tetrahydrogenated indenyl metallocene, polyethylene fraction A being substantially free of comonomer and having a low molecular weight and a high density relative to polyethylene fraction B, the bimodal HDPE resin having a molecular weight distribution (MWD), defined by the ratio of the weight average molecular weight Mw to the number average molecular weight Mn, of at least 3.5. The metallocene is selected from formulas (I) and (II) below.

When fraction A is prepared in the first reactor of the two reactors connected in series, the ratio of the melt index $MI_2$ of fraction A to the $MI_2$ of the bimodal HDPE resin is preferably in the range of 1.05 to 2000, preferably 1.1 to 1000, more preferably 1.2 to 500, and most preferably 1.2 to 250.

However, when fraction B is prepared in the first reactor of the two reactors connected in series, the ratio of the high load melt index HLMI of fraction B to the $MI_2$ of the bimodal HDPE resin is preferably in the range of 0.06 to 0.95, preferably 0.06 to 0.9, more preferably 0.06 to 0.85 and most preferably 0.06 to 0.80.

Preferably, the bimodal HDPE resin consists essentially of polyethylene fractions A and B.

Preferably, the metallocene comprises a bridged unsubstituted bis(tetrahydroindenyl), such as ethylene-bis(tetrahydroindenyl)zirconium dichloride and ethylene-bis(tetrahydroindenyl)zirconium difluoride.

Preferably, the two reactors in series are two loop reactors, more preferably two liquid full loop reactors i.e. a liquid full double loop reactor.

Preferably, polyethylene fraction A is produced in the first reactor and polyethylene fraction B is produced in the second reactor. Preferably, polyethylene fraction A is not degassed.

In an alternative embodiment, said polyethylene fraction B is produced in the first reactor and said polyethylene fraction A is produced in the second reactor, whereby the polyethylene fraction B is degassed, such that fraction A produced in the second reactor is substantially free of comonomer."

The invention also covers the process of producing a bimodal HDPE resin, wherein ethylene is polymerized in the presence of a metallocene-containing catalyst system, wherein the metallocene is a bridged bisindenyl and/or bridged bis-tetrahydrogenated indenyl metallocene, to produce polyethylene fractions A and B prepared in different reactors of two reactors connected in series, polyethylene fraction A being substantially free of comonomer and having a low molecular weight and high density relative to polyethylene fraction B, and the resulting bimodal HDPE resin has a molecular weight distribution of at least 3.5. The metallocene is selected from formulas (I) and (II) below.

When fraction A is prepared in the first reactor of the two reactors connected in series, the ratio of the $MI_2$ of fraction A to the $MI_2$ of the bimodal HDPE resin is preferably in the range of 1.05 to 2000, preferably 1.1 to 1000, more preferably 1.2 to 500, and most preferably 1.2 to 250. However, when fraction B is prepared in the first reactor of the two reactors connected in series, the ratio of the HLMI of fraction B to the $MI_2$ of the bimodal HDPE resin is preferably in the range of 0.06 to 0.95, preferably 0.06 to 0.9, more preferably 0.06 to 0.85 and most preferably 0.06 to 0.80.

Preferably, the bimodal HDPE resin consists essentially of polyethylene fractions A and B.

Preferably, the metallocene comprises a bridged unsubstituted bis(tetrahydroindenyl), such as ethylene-bis(tetrahydroindenyl)zirconium dichloride and ethylene-bis(tetrahydroindenyl)zirconium difluoride.

Preferably, the two reactors in series are two loop reactors, more preferably two liquid full loop reactors i.e. a liquid full double loop reactor.

Preferably, polyethylene fraction A is produced in the first reactor and polyethylene fraction B is produced in the second reactor. Preferably, polyethylene fraction A is not degassed.

In an alternative embodiment, said polyethylene fraction B is produced in the first reactor and said polyethylene fraction A is produced in the second reactor, whereby the polyethylene fraction B is degassed, such that fraction A produced in the second reactor is substantially free of comonomer.

The invention also covers injection-moulded articles, in particular caps and closures, prepared with the bimodal HDPE resin according to the invention, as well as the process of injection moulding for producing caps and closures with the bimodal HDPE resin according to the invention. Preferably, the cap or closure is suitable for closing bottles or containers. More preferably the cap or closure is suitable for closing bottles for carbonated or still drinks. Even more preferably, the article is a single-piece cap or closure, including a screw cap.

Finally, the invention also covers the use of the bimodal HDPE resin according to the invention in injection moulding to produce articles, in particular caps and closures, to reduce the cycle time during injection moulding and/or increase the mould's lifespan, and/or decrease maintenance frequency of the mould in comparison with HDPE resin having smaller MWD and/or made with Ziegler-Natta or other metallocene-containing catalyst systems.

DETAILED DESCRIPTION OF THE INVENTION

The term "bimodal" refers to the presence, within the same polyethylene resin, of two populations of polyethylene macromolecules i.e. polyethylene fractions A and B, each having different properties (for instance molecular weight or comonomer content).

Thus the bimodal HDPE resin is a blend at the polymer particle level wherein the different fractions can be obtained by operating two reactors under different polymerisation conditions.

Preferably, the bimodal HDPE resin has a bimodal molecular weight distribution.

The two reactors can be operated under the comonomer/hydrogen split mode of "inverse" (also described herein as "reverse") configuration, wherein a first low molecular weight, high density polyethylene fraction A is produced in the first reactor and a second high molecular weight, low density polyethylene fraction B is produced in the second reactor. In this case, the first polyethylene fraction does not need to be degassed before being transferred to the second reactor. Polyethylene fraction A will be substantially free of comonomer.

This is as opposed to the "direct" configuration, wherein the first high molecular weight, low density polyethylene fraction B is produced in the first reactor and the second low molecular weight, high density polyethylene fraction A is produced in the second reactor, in which case the first polyethylene fraction B does need to be degassed in order to substantially remove all unpolymerised comonomer and thus for said second fraction A to be substantially free of comonomer.

In the embodiment when fraction A is prepared in the first reactor of the two reactors connected in series, the ratio of the $MI_2$ of fraction A to the $MI_2$ of the bimodal HDPE resin ($MI_2R$) is in the range of 1.05 to 2000, preferably 1.1 to 1000, more preferably 1.2 to 500, and most preferably 1.2 to 250.

However, when fraction B is prepared in the first reactor of the two reactors connected in series, the ratio of the HLMI of fraction B to the $MI_2$ of the bimodal HDPE resin is in the range of 0.06 to 0.95, preferably 0.06 to 0.9, more preferably 0.06 to 0.85 and most preferably 0.06 to 0.80.

The bimodal HDPE resin according to the invention is prepared in the presence of a metallocene-containing catalyst system. The metallocene comprises a bridged bis-indenyl or bridged bis-tetrahydrogenated indenyl catalyst component. The metallocene is selected from one of the following formula (I) or (II):

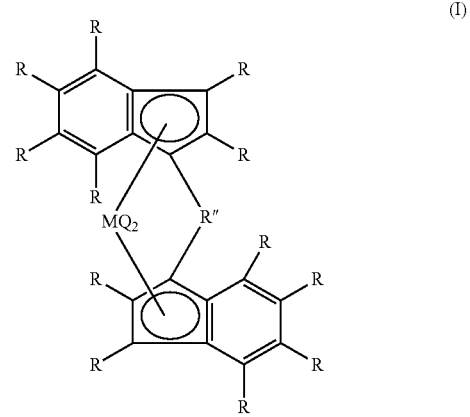

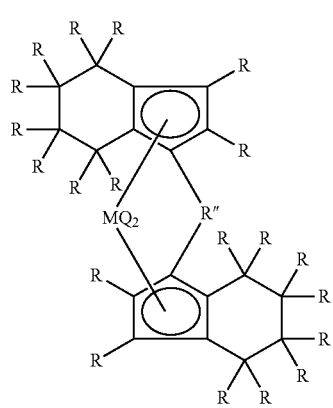
(II)

wherein each R is the same or different and is selected independently from hydrogen or XR'v in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls to impart stereorigidity that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydrogenated indenyl component may be substituted with R in the same way or differently from one another at one or more positions on the cyclopentadienyl ring or on the cyclohexenyl ring. Each substituent is independently chosen.

If the cyclopentadienyl ring is substituted, its substituent groups must not be so bulky as to affect coordination of the olefin monomer to the metal M. Any substituents XR'v on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl. Most preferably the metallocene is ethylene-bis(tetrahydroindenyl)zirconium dichloride or ethylene-bis(tetrahydroindenyl)zirconium difluoride.

The active catalyst system used for polymerising ethylene comprises the above-described catalyst component and a suitable activating agent having an ionising action.

Suitable activating agents are well known in the art: they include aluminium alkyls aluminoxane or boron-based compounds. Preferably, the activating agent is selected from aluminium alkyls, more preferably from one or more of TIBAL, TEAL or TNOAL. Most preferably, the activating agent is TIBAL.

Optionally, the catalyst component can be supported on a support. Preferably the support is silica, a modified silica alumina or a modified silica, for example MAO-modified silica or a fluorinated silica support.

The polymerisation of the metallocene-produced high density polyethylene can be carried out in gas, solution or slurry phase. Slurry polymerisation is preferably used to prepare the high density polyethylene. The polymerisation temperature ranges from 20 to 125° C., preferably from 55 to 105° C., more preferably from 60 to 100° C. and most preferably from 65 to 98° C. and the pressure ranges from 0.1 to 10 MPa, preferably from 1 to 6 MPa, more preferably from 2 to 4.5 MPa, for a time ranging from 10 minutes to 6 hours, preferably from 1 to 3 hours, most preferably from 1 to 2.5 hours.

A double loop reactor is preferably used for conducting the polymerisation. More preferably, the two reactors in series are preferably a liquid full double loop reactor wherein each loop is operated under different conditions in order to produce the bimodal HDPE resin. The double loop reactor can be operated in the inverse configuration wherein polyethylene fraction A is prepared in the first loop reactor and polyethylene fraction B is prepared in the second loop reactor. In this configuration polyethylene fraction A does not need to be degassed before being transferred to the second reactor, as it is already substantially free of comonomer. The double loop reactor can also be operated in the direct configuration wherein the polyethylene fraction B is prepared in the first loop reactor and the polyethylene fraction A is prepared in the second loop reactor. In this configuration the first polyethylene fraction B needs to be degassed before being transferred to the second reactor, such that fraction A produced in the second loop reactors is substantially free of comonomer.

Polyethylene fraction A, when prepared in the first reactor, preferably has an MI2 of from 10 to 1000 dg/min, preferably from 50 to 600 dg/min and most preferably from 100 to 300 dg/min. The density of this fraction A is preferably of from 0.960 to 0.980 g/cm$^3$, preferably from 0.965 to 0.975 g/cm$^3$ and most preferably from 0.970 to 0.975 g/cm$^3$. The proportion of this fraction ranges preferably from 40 to 65 wt %, more preferably from 45 to 65 wt %, even more preferably from 45 to 55 wt % and most preferably from 45 to 53 wt %, of the total weight of the bimodal HDPE resin. Preferably, the bimodal HDPE resin consists essentially of fractions A and B.

Polyethylene fraction B, when prepared in the first reactor, preferably has an HLMI of from 3 to 20 dg/min, preferably from 5 to 15 dg/min and most preferably from 5 to 10 dg/min. The density of this fraction B is preferably of from 0.925 to 0.940 g/cm$^3$, preferably from 0.930 to 0.940 g/cm$^3$ and most preferably from 0.930 to 0.935 g/cm$^3$. The proportion of this fraction ranges preferably from 35 to 60 wt %, more preferably from 35 to 55 wt %, even more preferably from 45 to 55 wt % and most preferably from 47 to 55 wt %, of the total weight of the bimodal HDPE resin. Preferably, the bimodal HDPE resin consists essentially of fractions A and B.

The first polyethylene fraction, A or B, from the first reactor is then transferred to the second reactor, wherein the second polyethylene fraction, B or A respectively, is prepared in the presence of the first fraction, thereby producing the chemically blended bimodal HDPE resin.

The bimodal HDPE resin has preferably a density of from 0.940 to 0.965 g/cm$^3$, more preferably of 0.948 to 0.957 g/cm$^3$, even more preferably of 0.950 to 0.955 g/cm$^3$, and most preferably of 0.951 to 0.954 g/cm$^3$. The bimodal HDPE resin preferably has a melt index MI2 of from 0.5 to 50 dg/min, preferably of from 0.5 to 10 dg/min, more preferably of from 0.5 to 8 dg/min, more preferably from 0.5 to 2.5 dg/min, yet more preferably 0.5 to 2.4 dg/min and most preferably 0.5 to 2.2 dg/min. The bimodal HDPE resin has a molecular weight distribution (MWD), which is the ratio of the weight average molecular weight Mw to the number average molecular weight Mn, that is at least 3.5, more preferably greater than 4.0, even more preferably greater than 4.1, most preferably greater than 4.2. The MWD of the bimodal HDPE resin is can be up to 6.0.

Density is measured following the method of standard test ASTM 1505 at a temperature of 23° C. on the pellets of the bimodal HDPE resin. Melt flow indices MI2 and HLMI are measured following the method of standard test ASTM D 1238 at a temperature of 190° C. and respectively under loads of 2.16 and 21.6 kg on the pellets of the bimodal HDPE resin. The molecular weight distribution (MWD) is the ratio of the weight average molecular weight Mw to the number average molecular weight Mn i.e. Mw/Mn. The molecular weights are determined by gel permeation chromatography (GPC) on the pellets of the bimodal HDPE resin.

The bimodal HDPE resin according to the invention has particular rheological properties. The bimodal HDPE resin of the invention has a rheological horizontal activation energy of more than 45 kJ/mol at a frequency of $1\ s^{-1}$ and a rheological horizontal activation energy of less than 45 kJ/mol at a frequency of $100\ s^{-1}$. More preferably, the bimodal HDPE resin has a rheological horizontal activation energy of more than 50 kJ/mol at a frequency of $1\ s^{-1}$ and a rheological horizontal activation energy of less than 40 kJ/mol at a frequency of $100\ s^{-1}$. This can be seen in FIG. 1. Rheological horizontal activation energy is measured on a Rheometrics® ARES rheometer at 170, 190 and 210° C. by inducing shear deformation within the linear viscoelastic regime (at 10% deformation) and recording complex viscosity at different shear rates.

The articles, in particular caps and closures, of the present invention are prepared by injection moulding of the resin according to the invention. Any injection machine known in the art may be used in the present invention, such as for example the ENGEL 125T. All mould types may be used. The caps and closures of the present invention are particularly suitable for closing bottles, in particular bottles for carbonated or still drinks. Advantageously, the resin according to the invention is particularly suitable for single-piece caps and closures, including screw caps.

The injection moulding cycle may be split into three stages: filling, packing-holding, and cooling. During filling, polymer melt is forced into an empty cold cavity; once the cavity is filled, extra material is packed inside the cavity and held under high pressure in order to compensate for density increase during cooling. The cooling stage starts when the cavity gate is sealed by polymer solidification; further temperature decrease and polymer crystallisation takes place during the cooling stage. Typical temperatures for the filling step are of from 160 to 280° C., preferably of from 220 to 260° C.

It has been observed that with the resin of the present invention, peak injection pressure is reduced compared to other materials processed under the same conditions (i.e. in comparison with Ziegler-Natta-catalysed monomodal and bimodal polyethylene and metallocene-catalysed bimodal polyethylene obtained from the "direct" reactor configuration without intermediate degassing, including when the metallocene has a bridged bisindenyl or bistetrahydroindenyl component, having the same or similar melt indices and densities and/or having an MWD of less than 3.5.). This reduction in pressure in itself induces less wear on the mould, hence extending its lifespan and/or reducing its maintenance frequency.

Alternatively, peak injection pressure can be maintained higher, instead allowing for a reduction in the processing temperature of the polymer, hence reducing the necessary cooling time (which leads to a decrease of cycle time) and thereby decreasing the overall energy consumption of the injection moulding cycle.

The articles, and in particular the caps and closures, according to the present invention are also characterised by an improved ESCR in comparison with monomodal Ziegler-Natta catalysed polyethylene and bimodal metallocene-catalysed polyethylene, wherein the high molecular weight, low density fraction is made in the first reactor, which is not degassed, including wherein the metallocene has a bridged bisindenyl or bistetrahydroindenyl component, having the same or similar melt indices and densities, and/or an MWD of less than 3.5.

Furthermore, the resins of the invention show a remarkably low content of volatile organic compounds without the need for aeration, thus avoiding an extra processing step and reducing the energy required for production. The advantageous organoleptic properties allow the resin to be used for making caps and closures, in particular for closing bottles, such as bottles for carbonated and still drinks. This is an advantage over resins made with Ziegler-Natta catalysts, which generally require an in-depth aeration step to remove the volatile organic compounds.

The bimodal HDPE resin of the present invention may contain additives, in particular additives suitable for injection moulding, such as, by way of example, processing aids, mould-release agents, anti-slip agents, primary and secondary antioxidants, light stabilizers, anti-UV agents, acid scavengers, flame retardants, fillers, nanocomposites, lubricants, antistatic additives, nucleating/clarifying agents, antibacterial agents, plastisizers, colorants/pigments/dyes and mixtures thereof. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mould-release agents such as calcium stearate, zinc stearate, SHT, antioxidants such as Irgafos 168™, Irganox 1010™, and Irganox 1076™, anti-slip agents such as erucamide, light stabilizers such as tinuvin 622™ and tinuvin 326™, and nucleating agents such as Milliken HPN20E™.

An overview of the additives that can be used in the injection-moulded articles of the present invention may be found in Plastics Additives Handbook, ed. H. Zweifel, $5^{th}$ edition, 2001, Hanser Publishers.

LIST OF FIGURES

FIG. 1 shows the rheological horizontal activation energy vs frequency comparing various polyethylene according to the prior art with the polyethylene ER-1, ER-2 and ER-3 according to the invention.

EXAMPLES

Tables 3a and 3b show examples of different comparative polyethylenes A-1, A-2, B-1, C-1 and C-2 and their respective properties in comparison with bimodal HDPE resins ER-1, ER-2 and ER-3 according to the invention, made with the metallocene ethylene-bis(tetrahydroindenyl)zirconium dichloride using the "inverse" double loop reactor configuration.

It should be noted C-2 is carried out using the "direct" double loop reactor configuration, but without degassing of the first polyethylene fraction. Thus the second fraction (lower weight average molecular weight, higher density fraction) comprises a substantial amount of comonomer coming from the first reactor.

The polymerization conditions for ER-1, ER-2 and ER-3 are given in Table 1 below.

TABLE 1

| | Parameter | | ER-1 | ER-2 | ER-3 |
|---|---|---|---|---|---|
| First reactor | Temperature | °C. | 95.0 | 95.0 | 95.0 |
| | Pressure | bar | 40 | 40 | 40 |
| | Diluent | | Isobutane | Isobutane | Isobutane |
| | Solids | Wt % | 31.0 | 31.0 | 31.0 |
| | C6/C2 feed ratio | Kg/T | 0 | 0 | 0 |
| | Contribution | Wt % | 49 | 48.5 | 48.4 |
| | MI2 | dg/min | 145 | 293 | 295 |
| | Density | g/cm³ | 972.0 | 974.0 | 974.0 |
| Second reactor | Temperature | °C. | 90 | 90 | 90 |
| | Pressure | bar | 40 | 40 | 40 |
| | Diluent | | Isobutane | Isobutane | Isobutane |
| | Solids | Wt % | 32.0 | 32.5 | 32.5 |
| | C6/C2 feed ratio | Kg/T | 50 | 61 | 61 |
| | C6/C2 concentration | Mass ratio | 0.19 | 0.24 | 0.24 |
| | MI2 (of the bimodal HPDE resin) | dg/min | 2.0 | 2.1 | 1.7 |
| | Density (of the bimodal HDPE resin) | g/cm³ | 952.2 | 952.3 | 952.6 |

The measurements of the various properties of the resins were carried out according to the following procedures:

The Bell Environmental Stress Crack Resistance (ESCR) F0 can be measured according to ASTM D1693 at 23° C. and 100% Igepal. The bimodal HDPE resin can have a Bell Environmental Stress Crack Resistance (ESCR) of at least 1500 hours.

TP VOC: The sample pellets of the resin were heated to 150° C. and the volatile organic compounds thereby released were adsorbed on a Tenax trap at −40° C. Flash desorption of the trap was carried out at 230° C. The compounds were detected and the amount of the desorbed volatile organic compounds were determined using a gas chromatography-flame ionization detector (GC-FID). The bimodal HDPE resin can have a volatile organic compound concentration of at most 250 ppm as measured by TPV OC.

Taste test: 5 g of pellets of the resin were put in 1 liter of water for 8 days at 55° C. Resulting water was diluted in a reference water at 0, 33, 50 and 66 wt % and tasted by a trained human panel. When a difference in taste was perceived compared to the reference water, a grade was given according to the table below.

TABLE 2

| % of test water | Grade |
|---|---|
| 100 | 0 |
| 66 | 0.5 |
| 50 | 1 |
| 33 | 2 |

Injection Moulding Processing A: The resin was injection-moulded on a Netstal Synergy 1000 injection machine equipped with a monocavity mould. The cap design was appropriate for carbonated soft drinks and fits on a PCO1810 neck. No masterbatch was added to the bimodal HPDE resin.

Injection Moulding Processing B: The resin was injection-moulded on a Netstal Synergy 4200K injection machine equipped with a 96-cavities mould. The cap design was appropriate for carbonated soft drinks and fits on a PCO1810 neck. 0.8 wt % of a masterbatch containing red pigment was added to the bimodal HDPE resin.

Ease of opening: A trained human panel was asked to rate the ease of opening of the bottles with the respective caps using grades 1 to 5, a grade 5 representing the easiest opening.

All other measurement standards and procedures are indicated in Table 3a and Table 3b.

TABLE 3a

| Resin ID | | — | A-1 | B-1 | A-2 | C-1 | C-2 | ER-1 | ER-2 | ER-3 |
|---|---|---|---|---|---|---|---|---|---|---|
| Catalyst | | — | ZN | ZN | ZN | Met THI | Met THI | Met THI | Met THI | Met THI |
| Configuration | | — | monomodal | monomodal | bimodal | monomodal | bimodal | bimodal | bimodal | bimodal |
| Double Loop Reactor Configuration | | | | | | | Direct (no degassing) | Inverse | Inverse | Inverse |
| Density of the resin (ASTM 1505) | | kg/m³ | 954.3 | 955.1 | 954.4 | 949.4 | 951.8 | 952.2 | 952.3 | 952.6 |
| MI2 of the resin (ASTM D1238) | | dg/min | 2.1 | 2.2 | 0.8 | 1.9 | 2.0 | 2.0 | 2.1 | 1.7 |
| Density of the first PE fraction (ASTM 1505) | | kg/m³ | N/A | N/A | N/A | N/A | 942.1 | 972.0 | 974.0 | 974.0 |
| MI2 of the first PE fraction (ASTM D1238) | | dg/min | N/A | N/A | N/A | N/A | 0.43 | 145 | 293 | 295 |
| Molecular weight (GPC) | Mn | kDa | 17 | 16 | 13 | 24 | 22 | 17 | 15 | 15 |
| | Mw | kDa | 108 | 106 | 135 | 65 | 71 | 73 | 70 | 75 |
| | Mz | kDa | 651 | 650 | 675 | 125 | 155 | 192 | 182 | 204 |
| | Mw/Mn | — | 6.3 | 6.5 | 10.2 | 2.7 | 3.2 | 4.4 | 4.6 | 4.8 |
| | Mz/Mw | — | 6.0 | 6.2 | 5.0 | 1.9 | 2.2 | 2.6 | 2.6 | 2.7 |
| Tensile test (ISO 527 specimen 1B) | Tensile modulus (standard deviation) | MPa | N/A | 1060 (19) | 1101 (19) | 966 (14) | 987 (18) | 1017 (12) | 957 (12) | 964 (8) |
| | Strength at yield (standard deviation) | MPa | N/A | 26.1 (0.2) | 25.8 (0.3) | 24.7 (0.2) | 25.0 (0.1) | 25.4 (0.1) | 24.7 (0.2) | 24.6 (0.1) |
| Organoleptic properties | Taste test (see description) | — | 1.7 | 1.2 | 1.6 | 0.5 | 0.8 | 1.2 | 1.2 | 1.1 |
| | VOC migration (EPA 524.2 rev 4.0) | — | N/A | all components below 0.1 ppb | N/A | N/A | N/A | N/A | N/A | N/A |
| | TP VOC (see description) | ppm | 329 | 284 | 794 | 112 | 101 | 173 | 177 | 221 |

TABLE 3b

| Resin ID | | — | A-1 | B-1 | A-2 | C-1 | C-2 | ER-1 | ER-2 | ER-3 |
|---|---|---|---|---|---|---|---|---|---|---|
| Catalyst | | — | ZN | ZN | ZN | Met THI | Met THI | Met THI | Met THI | Met THI |
| Configuration | | — | monomodal | monomodal | bimodal | monomodal | bimodal | bimodal | bimodal | bimodal |
| Double Loop Reactor Configuration | | | | | | | Direct (no degassing) | Inverse | Inverse | Inverse |
| Stress-cracking (ASTM D1693 23° C., 100% Igepal) | Bell ESCR - F0 | h | 358 | 259 | >1500 | 24 | 162 | >1500 | >1500 | >1500 |
| | Bell ESCR - F50 | h | 379 | 285 | nb | 42 | 163 | nb | nb | nb |
| Stress-cracking (ISO 16770, specimen D, 23° C., 11.44 MPa, 2% Igepal) | FNCT | h (standard deviation) | 8 (1) | 4 (1) | 44 (10) | 2 (1) | 5 (1) | 27 (3) | 36 (9) | 65 (9) |
| Processing A (see description) | Injection pressure | bar | 1019 | N/A | N/A | N/A | 831 | 755 | N/A | 811 |
| | Melt temperature | °C. | 220 | N/A | N/A | N/A | 220 | 220 | N/A | 220 |
| | Cycle time | s | 6.19 | N/A | N/A | N/A | 6.16 | 6.14 | N/A | 6.38 |
| | Dimensions | — | OK | N/A | N/A | N/A | OK | OK | N/A | OK |
| Processing B (see description) | Injection pressure | bar | N/A | 1707 | N/A | N/A | N/A | 1483 | N/A | N/A |
| | Melt temperature | °C. | N/A | 234 | N/A | N/A | N/A | 235 | N/A | N/A |
| | Cycle time | s | N/A | 4.23 | N/A | N/A | N/A | 4.24 | N/A | N/A |
| | Dimensions | — | N/A | OK | N/A | N/A | N/A | OK | N/A | N/A |
| Ease of Opening | | | 2 | 2 | 3 | 3 | 3 | 4 | 4 | 4 |

Discussion of the Results of Tables 3a and 3b

ER-1 and ER-3 according to the invention in comparison with C-1 show reduced injection pressure, thus providing reduced wear of the mould i.e. an increased lifespan and/or decreased mould maintenance frequency. ER-2 also shows a reduced injection pressure in comparison with C-2.

Alternatively, a higher injection pressure can be maintained allowing instead for a reduction in the processing temperature. This would lead to a reduction in the cycle time due to faster cooling. The reduced processing temperature also reduces energy consumption.

ER-1, ER-2 and ER-3 also show improved stress-crack resistance with respect to A-1, B-1, C-1 and C-2. ER-1, ER-2 and ER-3 show the same stress-crack resistance in comparison with A-2.

A-2 has good stress-crack resistance. However, its organoleptic properties are lacking. On the other hand, ER-1, ER-2 and ER-3 all have excellent processability and organoleptic properties.

Thus, the bimodal HDPE resins according to the invention are easily processed and have improved ESCR without deterioration of organoleptic properties.

The dimensional stability of the caps and tightness of fit of the caps on the bottles and the ease of opening of the bottles with these caps (obtained from injection moulding processing procedure B) were also determined. All caps according to the invention had better dimensional stability and exhibited improved tightness of fit than the comparative examples. The bottles with the caps according to the invention were also easier to open than the comparative examples.

The invention claimed is:

1. A process for preparing an article comprising:
injection molding a bimodal high density polyethylene (HDPE) resin having a molecular weight distribution (MWD), defined by the ratio of the weight average molecular weight (Mw) to the number average molecular weight (Mn), of at least 4.0 and of up to 6.0;
wherein the bimodal HDPE resin comprises two polyethylene fractions A and B, fraction A being substantially free of comonomer and having a lower weight average molecular weight and a higher density than fraction B, each fraction prepared in different reactors of two reactors connected in series in the presence of a metallocene-containing catalyst system;
wherein when fraction A is prepared in the first reactor of the two reactors connected in series, the ratio of the $MI_2$ of fraction A to the $MI_2$ of the bimodal HDPE resin is in the range of 1.05 to 2000;
wherein when fraction B is prepared in the first reactor of the two reactors connected in series, the ratio of the HLMI of fraction B to the $MI_2$ of the bimodal HDPE resin is in the range of 0.06 to 0.95; and
wherein the metallocene is selected from at least one of the following formula (I) or (II):

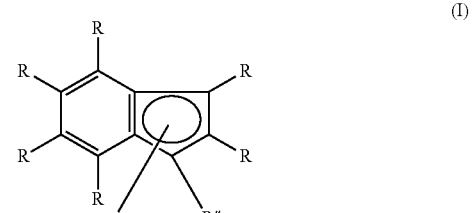

(I)

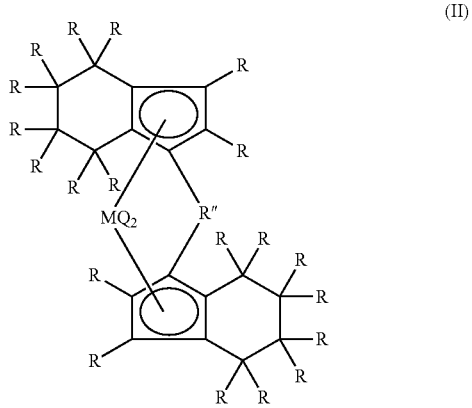

(II)

wherein each R is the same or different and is selected from hydrogen or XR'$_v$, in which X is chosen from carbon, silicon, germanium, oxygen or nitrogen, and each R' is the same or different and is chosen from hydrogen or a hydrocarbyl of from 1 to 20 carbon atoms and v+1 is the valence of X;

wherein R" is a structural bridge between the two indenyl or tetrahydrogenated indenyls to impart stereorigidity that comprises a $C_1$-$C_4$ alkylene radical, a dialkyl germanium, silicon or siloxane, or an alkyl phosphine or amine radical;

wherein Q is a hydrocarbyl radical having from 1 to 20 carbon atoms or a halogen; and wherein M is a transition metal Group 4 of the Periodic Table or vanadium.

2. The process of claim 1, wherein the metallocene comprises a bridged unsubstituted bis(tetrahydroindenyl).

3. The process of claim 2, wherein the metallocene is selected from ethylene-bis(tetrahydroindenyl)zirconium dichloride and ethylene-bis(tetrahydroindenyl)zirconium difluoride.

4. The process of claim 1, wherein the two reactors connected in series are a double loop reactor.

5. The process of claim 4, wherein the double loop reactor is a liquid full double loop reactor.

6. The process of claim 1, wherein a melt index $MI_2$ of the bimodal HDPE resin, measured following the method of standard test ASTM D 1238 at a temperature of 190° C. and under a load of 2.16 kg, is from 0.5 to 50 dg/min, and a density of the bimodal HDPE resin, measured following the method of standard test ASTM 1505 at a temperature of 23° C., is from 0.940 to 0.965 g/cm$^3$.

7. The process of claim 1, wherein the polyethylene fraction A is obtained from the first reactor and the polyethylene fraction B is obtained from the second reactor.

8. The process of to claim 7, wherein the polyethylene fraction A has a melt index $MI_2$, measured following the method of standard test ASTM D 1238 at a temperature of 190° C. and under a load of 2.16 kg, of from 10 to 1000 dg/min, and a density, measured following the method of standard test ASTM 1505 at a temperature of 23° C., of from 0.960 to 0.980 g/cm$^3$.

9. The process of claim 1, wherein the polyethylene fraction B is obtained from the first reactor and the polyethylene fraction A is obtained from the second reactor, and wherein fraction B has an HLMI ranging from 3 to 20 dg/min.

10. The process of claim 1, wherein a rheological horizontal activation energy of the resin at a frequency of 1 s$^{-1}$ is more than 45 kJ/mol and at a frequency of 100 s$^{-1}$ is less than 45 kJ/mol.

11. The process of claim 10, wherein the rheological horizontal activation energy of the resin at a frequency of 1 s$^{-1}$ is more than 50 kJ/mol and at a frequency of 100 s$^{-1}$ is less than 40 kJ/mol.

12. The process of claim 1, wherein the bimodal HDPE resins has a Bell Environmental Stress Crack Resistance (ESCR) F0 of at least 1500 hours and a volatile organic compound concentration of at most 250 ppm, measured by:
heating the sample of the resin to 150° C.,
adsorbing the thereby released volatile organic compounds from the sample on a trap at −40° C.
followed by flash desorption of the trap at 230° C.
and detecting and determining the amount of desorbed volatile organic compounds using a gas chromatography—flame ionization detector.

13. The process of claim 1, wherein the article is a cap or a closure.

14. The process of claim 1, wherein R is selected from hydrogen, methyl, ethyl, n-propyl, isopropyl, n-butyl or t-butyl.

15. The process of claim 1, wherein Q is chlorine or fluorine.

16. The process of claim 1, wherein the bimodal HDPE resin comprises from 40 to 65 wt. % of fraction A and from 35 to 60 wt. % of fraction B.

* * * * *